United States Patent

Fuhrmann et al.

[15] 3,668,182
[45] June 6, 1972

[54] BETA HYDROXYETHOXY PHENYL ISOPROPYLIDENE BENZOIC ACID AND ESTER DERIVATIVES METHOD OF PREPARATION AND POLYMERS OF SAID COMPOUNDS

[72] Inventors: Robert Fuhrmann, Morris Plains; John Pisanchyn, Morristown; Fred William Koff, Clifton, all of N.J.

[73] Assignee: Allied Chemical Corporation, New York, N.Y.

[22] Filed: Jan. 20, 1970

[21] Appl. No.: 4,401

[52] U.S. Cl. ..................260/47 C, 117/161 K, 260/473 R, 260/473 S, 260/520
[51] Int. Cl. .......................................................G08c 17/02
[58] Field of Search ..................260/476, 473 S, 473 R, 520

[56] References Cited

UNITED STATES PATENTS 2,444,594  7/1948  Day et al. ..............................260/520
3,398,121  8/1968  Oxenrider et al. ...................260/47 C Primary Examiner—William H. Short
Assistant Examiner—L. L. Lee
Attorney—Herbe G. Burkard

[57] ABSTRACT

Polycondensation of monomer of the structure:

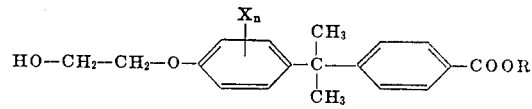

wherein R is H or a $C_1$–$C_6$ alkyl group, wherein X is an alkyl radical of up to four carbons, chlorine or bromine, and $n$ is 0–4, affords polymers having recutting units of the structure:

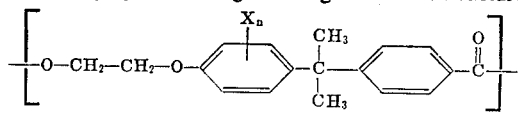

These polymers have good thermal stability and transparency and a high, but not unduly high, glass transition temperature.

6 Claims, No Drawings 3,668,182

BETA HYDROXYETHOXY PHENYL ISOPROPYLIDENE BENZOIC ACID AND ESTER DERIVATIVES METHOD OF PREPARATION AND POLYMERS OF SAID COMPOUNDS

BACKGROUND OF THE INVENTION

Polyesters such as polyethylene terephthalate are widely used in a variety of fiber and film applications. However, there is always a need for polyesters having superior properties in one or more areas. For example, U.S. Pat. No. 3,398,121 describes polymers useful in the preparation of heat-resistant films. Such polymers are prepared from monomers of the structures:

(I)
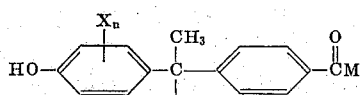

wherein X is an alkyl radical of 1-4 carbons, chlorine or bromine, M is hydroxyl or a substituent hydrolyzable thereto, and $n$ is 0-4.

The instant invention relates to ester condensation polymers prepared from monomers of the structure;

(II)
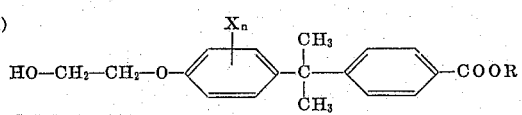

wherein R is H or a $C_1$-$C_6$ alkyl group, wherein X is an alkyl radical of up to four carbons, chlorine or bromine, and wherein $n$ is 0-4. Such polyester polymers consist essentially of recurring units of the structures:

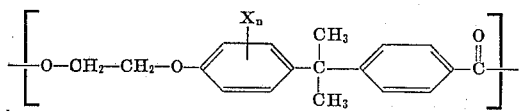

wherein X and $n$ are as defined above.

Monomers of structure (II) undergo condensation polymerization much more readily than the monomers of structure (I) thereby facilitating the preparation of polyesters therefrom. Additionally, the polymers prepared from the monomer, i.e., compound, of structure (II) have a glass transition temperature substantially lower than that of the polymers prepared from monomer (I).

Many polymers suffer from an unduly low glass transition temperature in that they lack sufficient structural integrity at temperatures to which they may become exposed during service. However, an extremely high glass transition temperature is also sometimes undesirable in that it makes it difficult to process the polymer in conventional blow-molding or extrusion equipment.

SUMMARY OF THE INVENTION

It has now been found in accordance with the instant invention that monomers of structure (II) can be readily condensation polymerized to afford polymers consisting essentially of recurring units of the structure:

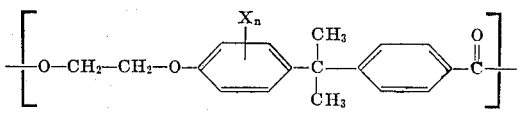

The polymerization of monomer (II) is effected by heating monomer (II) in the presence of a catalyst of the type that forms condensation polymers between diesters and glycols. These catalysts are well known in the condensation polymerization art. Suitable catalysts include oxides of metals of Group V of the Periodic Table, alkali metal alkoxy titanates, tetraalkyl titanate esters, alkaline earth salts of weak inorganic or organic acids, and metallic magnesium.

We have found that a particularly suitable catalyst in the instant case is a tetraalkyl titanate ester, in particular, tetrabutyl titanate or tetraoctyl titanate. The polymerization is suitably effected at any temperature above the melting point of the monomer and below the thermal decomposition temperature of the polymer or monomer. A preferred polymerization temperature is from about 165° to 400° C., particularly 230° to 290° C. The duration of polymerization will depend upon the temperature of polymerization and the particular monomer being polymerized. Ordinarily, polymer of a suitable degree of polymerization, i.e., 20 to 500, will be obtained by heating the monomer for from about 1 to 24 hours, preferably 4 to 10 hours.

During polymerization, the moiety, ROH, is evolved. As heretofore indicated, R is either hydrogen or a $C_1$-$C_6$ alkyl group. Such moiety, i.e., either water or an aliphatic alcohol, will ordinarily be in vapor form under the polymerization temperature conditions, which is desirable since such moiety should be removed from the reaction mixture. Such removal is desirably facilitated by conducting the polymerization at reduced pressure. It is also desirable that such polymerization be carried out under an inert, water- and oxygen-free atmosphere, for example, carbon dioxide, nitrogen, helium, neon, or argon. Such inert atmosphere substantially reduces the formation of undesirable by-products and color-causing contaminants in the polymer.

The monomer of structure (II) is produced in the following fashion:

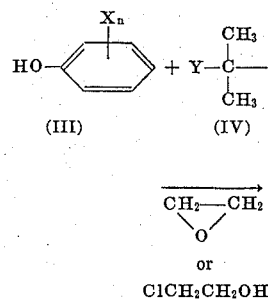

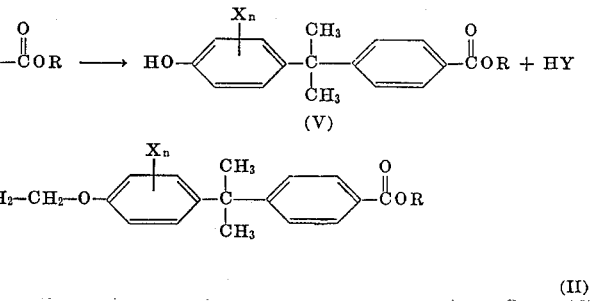

The polymers prepared in accordance with the instant invention have a sufficiently high glass transition temperature to make them useable in a very wide variety of applications either in the form of films or in the form of fibers. However, since their glass transition temperature is lower than that of the polymers prepared from monomers of structure (I), they are more readily processable in conventional equipment than said latter polymers. Moreover, their thermal stability is superior to that of polyethylene terephthalate. Additionally, the polymers prepared from the monomer of structure (II) are wherein R, X and n are as previously defined and wherein Y is hydroxy, bromine or chlorine. Compound (III) is phenol or a phenol substituted with one or more substituents, X. Compound (IV) is cumic acid or an ester thereof substituted in the alpha-position with a hydroxyl, bromo or chloro moiety. Phenol (III) can also be reacted with a p-isopropenyl benzoic acid in the presence of strong acid to form the desired compound (V).

The reaction between the alpha-substituted cumic acid and the phenolic compound is suitably carried out in an inert solvent medium using either an equal molar ratio of reactants or an excess of either reactant. We prefer, however, to obtain a liquid reaction medium simply by using an excess of the phenolic compound and by conducting the reaction at a temperature ranging from just above the melting point up to the reflux temperature of the phenolic compound. Temperatures between about 45° and 180° C. are suitably used in the case of phenol, which melts at about 42° C. and refluxes at about 182° C. at atmospheric pressure. Use of an excess of phenolic compound rather than excess of the alpha-substituted cumic acid minimizes the formation of side products including position isomers that result when alpha-substituted cumic acid reacts with the ring of the phenolic compound at more than one position. Pure compound (V) is most suitably obtained from the crude reaction product by recrystallization of the latter from nitromethane or nitroethane. We have found other solvents to be significantly inferior. Although the cumic acid esters react well with phenol, the product could not be recrystallized from any solvent tested.

As above indicated, when Y is bromine or chlorine, the reaction between phenol and the alpha-substituted cumic acid liberates HCl or HBr, respectively. These acids are particularly desirable as reaction products in that they increase the reaction rate of the phenolic compound with the alpha-substituted cumic acid. We can, if desired, employ HCl or HBr as catalysts for the reaction of alpha-hydroxy cumic acid or p-isopropenyl benzoic acid or employ alpha-chlorocumic acid or alpha-bromocumic acid as the reactant in which case, addition of such catalyst is not necessary.

The use of a substituted phenol having substituents, X, selected from the group consisting of alkyl radicals of 1–4 carbon atoms, chlorine and bromine at one or more of the ortho- and/or meta- position results in product (V) having corresponding substitution on the hydroxyphenyl group. As is apparent, it is essential that the position para to the hydroxyl group of the phenol be unsubstituted. For instance, the use of o-cresol gives α-(3-methyl-4-hydroxyphenyl)cumic acid; 2,6-xylenol gives α-(3,5-dimethyl-4-hydroxyphenyl) cumic acid; while the use of o-bromophenol gives α-(3-bromo-4-hydroxyphenyl)cumic acid. Alternately, a chlorine or bromine ring substituted hydroxyphenyl cumic acid can be obtained by first obtaining α-(p-hydroxyphenyl)cumic acid by reaction of phenol with α-bromo- or α-chlorocumic acid and then post-chlorinating or post-brominating the product by conventional means, whereby the hydroxy substituent on the hydroxylphenyl group directs substitution of the halide atom to the phenyl ring having said hydroxy group.

In the preparation of the α-substituted cumic acid, α-hydroxy-cumic acid is prepared by the oxidation of cumic acid with aqueous KMnO₄ or similar oxidizing agent, while α-chlorocumic acid or α-bromocumic acid are prepared by reaction of cumic acid with chlorine or bromine, respectively, preferably in a halogenated aliphatic hydrocarbon solvent such as CCl₄ at a temperature of 30° to 75° C. Esters of cumic acid can be prepared from the free acid by conventional methods and can then be reacted with phenol as above to prepare the α-hydroxyphenol-substituted cumic acid ester, i.e., compound (V) wherein R is a C₁ to C₆ alkyl group which after saponification to the acid can be readily purified by recrystallization from nitromethane or nitroethane.

Compound (V), which is the same as monomer (I), is transformed into monomer (II) by reaction with excess ethylene oxide or ethylene chlorohydrin. The reaction with ethylene chlorohydrin is preferably carried out in a basic, aqueous menstruum at 50°–95° C., preferably 60°–80° C. A preferred pH is about 9 to 12. The reaction with ethylene oxide is preferably also carried out under similar conditions. After reaction is complete, the reaction mixture is acidified, resulting in precipitation of the desired product, i.e., monomer (II), which may be collected by filtration or decantation. This acid may, if desired, be purified by recrystallization from nitromethane or nitroethane. We have found that compound (V) will not react with ethylene oxide in the melt or in nonaqueous solvent. If desired, monomer (II) can be further purified by recrystallization from nitromethane or nitroethane. The ethoxylation reaction is ordinarily complete in from about 1 to 4 hours. The reaction can be readily followed by thin layer chromatographic analysis of aliquots of the reaction mixture. Compound (II), wherein R = H, is a novel compound.

Condensation polymerization of compound (II) is, as heretofore indicated, effected by heating in the presence of a catalyst. The polymerization of compound (II) is most readily effected when group R of compound (II) is methyl or ethyl. As heretofore indicated, compound (II) is most readily prepared when R = H, i.e., when (II) is the free acid. Transformation of compound (II), wherein R = H, into compound (II), wherein R = methyl or ethyl, is most readily effected by simply refluxing the free acid with excess of methanol or ethanol, respectively, in the presence of a catalytic amount of a strong acid such as sulfuric. This ester is a novel compound.

A modified polyethylene terephthalate having improved thermal properties can be prepared by incorporating up to about 40 weight per cent of monomer (II) into the polyethylene terephthalate polymerization charge. It should also be noted that virtually any molar ratio of other hydroxy acids can be copolymerized with monomer (II), including meta- or parahydroxy benzoic acid or 6-hydroxy-caproic acid. Also, diols and diacids can be copolymerized with monomer (II). In all cases there is thereby provided copolymers having recurring units of the structure:

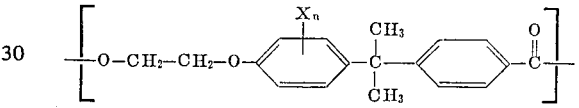

The number of such units depends primarily on the mol ratio of monomer (II) to comonomer or comonomers.

The invention can be more fully understood by reference to the following examples. All parts are parts by weight unless otherwise expressly noted.

EXAMPLE 1

Into a 3-liter, 4-necked, round-bottom pyrex flask fitted with a thermometer, a condenser, a dropping funnel, and a Teflon-bladed motor-driven stirrer were charged 121.6 grams (0.74 mols) of cumic acid and 2000 ml. of CCl₄. A 100-watt light bulb was placed one-half inch from the side of the reaction flask near the middle of the charge. After brief stirring, solution occurred at room temperature. A solution of 119.5 grams (0.75 mol) of bromine in 80 ml. of CCl₄ was added to the dropping funnel. The cumic acid/CCl₄ solution in the reaction flask was brought up to 35° C., and the light was turned on. The dropwise addition of the bromine/CCl₄ solution to the stirred cumic acid/CCl₄ solution in the reaction flask was then begun. An induction period of 16 minutes, during which time the addition of the bromine/CCl₄ solution was suspended, occurred. After the induction period, the reaction commenced. As the bromine addition continued, solid product precipitated out of the reaction solution. The reaction temperature was therefore gradually increased during the bromination to maintain a clear solution. The maximum reaction temperature was 75° C. (reflux). Duration of the bromine/CCl₄ addition was 2.0 hours. After the addition was complete, the reaction mixture was heated to reflux (75° C.) for a further 0.5 hour. At this time, the reaction mixture was strongly colored. The reaction mixture was then cooled to 10° C. to crystallize out the product. The product was filtered on a glass frit with suction and dried to give 153.5 grams of alpha-bromocumic acid (melting point 160° C.). The filtrate was flash evaporated at reduced pressure to obtain a concentrate which, when cooled to 10° C., yielded a second crop of product (melting point 156°–158° C., 9.5 grams). The second crop was recrystallized from CCl₄.

Total product obtained was 163.1 grams or a 90.6 mol percent isolated yield of alpha-bromocumic acid.

This α-bromocumic acid was transformed into α-(p-hydroxyphenyl)cumic acid in accordance with the procedure of Example 2 of U.S. Pat. No. 3,398,121.

EXAMPLE 2

An alternative reaction sequence involves preparation of the methyl ester of p-cumic acid, bromination of this methyl ester to afford methyl alpha-bromo cumate, followed by alkylation of this alpha-bromo compound with phenol or a substituted phenol. The advantage accruing from use of the methyl ester in the initial bromination is that it is much more soluble in a reaction solvent such as $CCl_4$, so that a much smaller volume of reaction solvent need be processed. However, no direct procedure could be found for the purification by recrystallization of methyl α-(p-hydroxyphenyl)cumate.

To purify this product, it was necessary to saponify methyl ester to the free acid and purify the latter by recrystallization from nitromethane or nitroethane.

A. Preparation of Methyl p-Isopropyl Benzoate (Methyl Cumate)

A solution of 300.3 grams (1.83 mols) of p-isopropyl benzoic acid (cumic acid), 474.0 (14.8 mols) of methanol, and 32 grams of concentrated sulfuric acid was refluxed for 7 hours in a 1-liter, round-bottom flask. After cooling to room temperature, the reaction solution was flash evaporated at reduced pressure on a rotating flash evaporator to remove most of the methanol. The evaporation residue was poured into a 2-liter separatory funnel containing 500 ml. of water. The reaction flask was rinsed with 100 ml. of ether and the ether rinse added to the separatory funnel. The ether layer was decanted and the aqueous layer then extracted with an additional 200 ml. of ether. The ether extracts were combined and washed once with 250 ml. of saturated aqueous $NaHCO_3$ and then once with 250 ml. of distilled water. The washed ether extract was then dried over anhydrous $MgSO_4$ and filtered. The filtered $MgSO_4$ was washed once with 100 ml. of ether and the ether wash was added to the filtrate. The combined ether solutions were then flash evaporated on a rotating flash evaporator. The evaporation residue was distilled at reduced pressure in a glass helices-packed column to yield 308.3 grams of methyl p-isopropyl benzoate (methyl cumate) (boiling point 84° C/1.0mm; yield 94.5 mol %).

B. Preparation of Methyl α-Bromo Cumate by the Bromination of Methyl Cumate

Into a 3-liter, 4-necked, round-bottom, Morton flask equipped with a thermometer, a dropping funnel, a condenser and a teflon-bladed, motor-driven stirrer were charged 299.8 grams (1.682 mols) of methyl p-isopropyl benzoate (methyl cumate) and 1440 ml. of $CCl_4$. A solution of 268.8 grams (1.682 mols) of bromine in 175 ml. of $CCl_4$ was charged to the dropping funnel. The solution in the reactor was brought up to 30° C. by a warm water bath and a 100-watt light bulb, which was placed one-half inch from the sides of the flask at the middle was lit. The bromine/$CCl_4$ solution was added dropwise to the reaction flask with vigorous stirring. An induction period of 7–12 minutes was observed during which time the bromine/$CCl_4$ addition was stopped. After reaction commenced the temperature was maintained at 30° C. during the bromine/$CCl_4$ addition. Addition time was 4 hours. After addition of the bromine/$CCl_4$ solution and when the reaction mixture appeared to be decolorized, it was flushed with nitrogen with vigorous stirring for 1 hour to remove some of the dissolved HBr. The reaction mixture was then flash evaporated at reduced pressure to remove the $CCl_4$ and the remaining HBr. The residue remaining is crude methyl α-bromo cumate (453 grams) which contains a small amount of $CCl_4$ (Ca. 4.5 percent). The crude methyl α-bromo cumate, a pale, lemon-yellow liquid, is stored in a refrigerator until use. It is used without further treatment or purification in the alkylation of phenol.

C. α-(p-Hydroxyphenyl)Cumic Acid by Alkylation of Phenol With Methyl α-Bromo Cumate Into a 3-liter, 4-necked, round-bottom, Morton flask fitted with a thermometer, a condenser, a dropping funnel and a teflon-bladed, motor-driven stirrer was charged 1,830 grams (19.3 mols) of phenol. To the dropping funnel was charged 451.6 grams (1.68 mols) of crude methyl α-bromo cumate containing about 4.5 percent of $CCl_4$. The phenol in the reaction flask was brought up to 65° C. and the dropwise addition of the methyl α-bromo cumate was begun with vigorous stirring while maintaining the reaction temperature at 65° C. Addition time was 2 hours. The reaction mixture was then increased to 95° C. for 1 hour. The reaction mixture was then cooled to 50° C. and 1.5 liters of benzene added. This solution was added to a 6-liter separatory funnel and washed twice with 400 ml. portions of water. A small amount of NaCl was used to break the emulsion which formed. The water-washed benzene solution was then flash evaporated to remove benzene and water and to obtain the crude alkylation product which also contains excess phenol.

The crude alkylation product was subjected to a distillation at about 0.5 mm. to remove the excess phenol. Distillation was continued until no further distillate comes over when a maximum oil bath temperature of 215° C. is employed. The residue remaining is the methyl and phenyl esters of the o-, m- and p-isomeric hydroxyphenyl cumic acids, together with a small amount of phenol. The residue weighed 451.5 grams.

To the residue in the 3-liter, round-bottom flask was added at 15 percent aqueous NaOH solution containing 100 grams of NaOH, and the mixture refluxed 3 hours. After cooling to room temperature the mixture was acidified with dilute $H_2SO_4$ and cooled with agitation. The product comes out as an oil which solidifies at room temperature. The hard cake was separated from the water layer and broken into lumps. The lumps were agitated with the water manually and then in a Waring blender to achieve a fine particle size slurry, which was filtered. The filtered solids were dried in a vacuum oven at 50° C. to obtain 427.7 grams of the mixture of the isomeric o-, m- and p-hydroxy phenyl cumic acids.

The isomeric mixture of hydroxyphenyl cumic acids was recrystallized twice from hot nitromethane from which was obtained 344.7 grams of pure α-(p-hydroxyphenyl)cumic acid including material from a second crop (melting point 174°–175.5° C.).

Yield of α-(p-hydroxyphenyl)cumic acid was 81.2 mol per cent based on methyl cumate, and including the steps of bromination, alkylation, saponification, acidification, and recrystallization.

EXAMPLE 3

Preparation of α-(p-Hydroxyethoxyphenyl)Cumic Acid by the Reaction of Ethylene Oxide With α-(p-hydroxyphenyl)Cumic Acid Into a 3-neck, 100-ml. round-bottom flask fitted with a condenser, thermometer, a teflon-bladed, motor-driven stirrer, and a pH electrode were charged 2.56 grams (0.01 mol) of α-(p-hydroxyphenyl)cumic acid and 15.47 grams of 1NNaOH. The reactor was flushed with nitrogen while the reaction mixture temperature was brought up to 70° C. The system was then flushed with ethylene oxide without agitation. Ethylene oxide flow was then begun to the stirred reaction mixture while keeping the temperature at 68°–70°C. and the pH at 9.7–11.2. Ethylene oxide was passed through the system without recycle. The pH was maintained at 9.7–11.2 by the dropwise addition of concentrated $H_2SO_4$. Samples were removed from the reactor at intervals and analyzed by thin layer chromato-graphic to determine the completeness of the reaction.

After two hours of reaction thin layer chromatographic analysis indicated 90 percent reaction and the presence of a third component which disappears upon saponification, i.e., the hydroxyethyl ester of the desired ethoxylation product.

After termination of the ethoxylation reaction (2 hours) additional NaOH was added to the reaction mixture and the mixture then refluxed at 100° C. for 2.5 hours to saponify all esters. After saponification, the mixture was extracted with ether. The NaOH solution was cooled in ice water and then acidified with dilute $H_2SO_4$ with stirring.

A white precipitate was obtained which was collected by filtration, washed with water, and dried in a vacuum oven to obtain 2.39 grams of material of melting point 112°–118°C. A sample of the product was recrystallized from hot nitromethane to obtain a white crystalline solid of melting point 118°–120° C.

Isolated yield of the α-[p(β-hydroxyethoxy)phenyl]cumic acid after recrystallization from nitromethane was 62 mol per cent. Product identity was confirmed by infrared and nuclear magnetic resonance spectra.

EXAMPLE 4

Preparation of α-[p-(β-Hydroxyethoxy)phenyl]Cumic Acid by the Reaction of Ethylene Chlorohydrin With α-(p-Hydroxyphenyl)Cumic Acid Into a 250 ml., 4-necked, round-bottom flask containing a magnetic stirring bar and fitted with a thermometer, a condenser, a dropping funnel, a burette, and a combination pH electrode, were charged 12.0 grams (0.30 mol) of NaOH and 100 ml. of water. The reaction flask and the aqueous NaOH solution was then flushed with nitrogen, and 51.26 grams (0.20 mol) of α-(p-Hydroxyphenyl) cumic acid was added in portions to the aqueous NaOH solution with stirring. The reaction mixture was then brought up to 70° C., at which time the pH was 10.15. The dropwise addition of 24.0 grams (0.30 mol) of ethylene chlorohydrin was begun to the stirred aqueous NaOH solution of α-(p-hydroxyphenyl)cumic acid at 70° C. The pH remains at 10.2 during the greater part of the ethylene chlorohydrin addition. When the pH started to drop, the dropwise addition of aqueous 20% NaOH solution was begun to maintain the pH at 9.6 to 10.2. Ethylene chlorohydrin addition time was 1.8 hours. After the completion of the addition of the ethylene chlorohydrin, the pH was maintained at 10.00 and the temperature at 70° C. for an additional hour. Thin layer chromatographic analysis of the reaction mixture showed the absence of starting material and, hence, complete conversion. The reaction mixture was then brought up to 100° C., and additional NaOH added. Reflux was continued for 2 hours. The reaction mixture was then poured into a separatory funnel, diluted with 250 ml. of water, acidified with dilute $H_2SO_4$ and extracted three times with 200 ml. portions of ether. The ether extracts were combined and dried over anhydrous $MgSO_4$, filtered and flash evaporated to give 59.7 grams of crude product. After two recrystallizations from nitromethane, there was obtained 56.8 grams of pure product. Melting point of the twice-recrystallized product was 123° C. Isolated yield of the product, α-[p-(α-hydroxyethoxy)phenyl]cumic acid was 94.8 mol per cent.

EXAMPLE 5

Preparation of Methyl α-[p-(β-Hydroxyethoxy)Phenyl]Cumate

Into a 3-liter, 3-necked round-bottom flask containing a magnetic stirring bar and fitted with a thermometer and a condenser, were charged 250.5 grams (0.835 mol) of α-[p-(β-hydroxyethoxy)phenyl]cumic acid, 2 liters of methanol and 50.0 grams of concentrated sulfuric acid. The resultant mixture was refluxed for 3 hours at which time thin layer chromatographic analysis showed the complete absence of starting material. The reaction mixture was flash evaporated to obtain a concentrate which was washed once with aqueous, saturated $NaHCO_3$, once with water, extracted three times with 250 ml. portions of ether, and three times with 250 ml. portions of $CHCl_3$. The combined organic extracts were washed once with 250 ml. of water, dried over anhydrous $MgSO_4$, and filtered. The dried and filtered extract was flash evaporated to obtain a concentrate from which was obtained by a rapid and sudden crystallization during the flash evaporation, followed by drying, white crystals of the desired product (241.6 grams) of melting point 93°–94° C.

Isolated yield of the product was 92.2 mol per cent. Product identity was confirmed by infrared and nuclear magnetic resonance spectra.

EXAMPLE 6

Polymerization of Methyl α-[p-(β-Hydroxyethoxy)Phenyl]Cumate

To a polymerization tube was added 9.7 grams of the recrystallized ester prepared as above, together with 0.02 grams of tetraisopropyl titanate. The tube and charge were placed in an aluminum heating block to polymerize the sample and to form poly -α-[p-(ethyleneoxy)-phenyl]cumate. The polymerization conditions were as follows: 1.0 hour at 246°–251° C. at atmospheric pressure and under a nitrogen purge to assist in removal of methanol; 1.0 hour at 251°–261 °C. and 4–5 mm. pressure; 5.0 hours at 261°–271° C. and 0.3–0.5 mm. pressure; cooled to room temperature; and removed from the glass polymerization tube. The polymer was cooled with powdered Dry-Ice and ground to 20 mesh in a Wiley mill. The specific viscosity of the polymer was found to be 0.55; Tg., 95°–100°C. This polymer was readily melt extruded into a 6 mil film of excellent clarity.

EXAMPLE 7

One hundred and thirty grams (2.1 mols) of ethylene glycol, 195 grams (1.0 mol) of dimethylterephthalate and 0.1 grams of calcium acetate were heated for 8 hours at 175° C. with a nitrogen sparge to remove the methanol formed by transesterification of the terephthalic acid ester. Then 125 grams (0.4 mol) of methyl-α-[p-(β-hydroxyethoxy)-phenyl]cumate was added. This reaction mixture was then heated at 260° C. for 10 hr. under a nitrogen sparge to remove the excess ethylene glycol and methanol formed by the combined transesterification-copolymerization. The resultant polymer contained approximately 4 units of the structure:

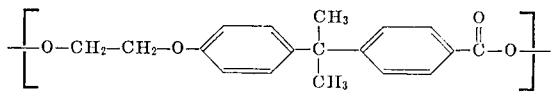

for every ten units of the structure:

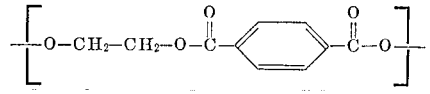

This copolymer could be extruded into a film having superior thermal stability to polyethylene terephthalate film.

We claim:

1. A compound of the structure:

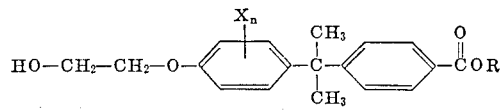

wherein R is H or a $C_1$ to $C_6$ alkyl group, wherein X is an alkyl radical of up to four carbons, chlorine or bromine, and wherein $n$ is 0 to 4.

2. A compound in accordance with claim 1 wherein $n = 0$ and wherein R is H or methyl.

3. A process for preparing a compound of the structure:

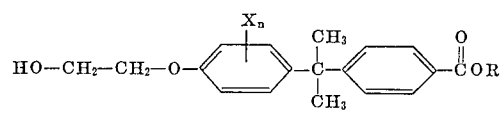

comprising reacting a compound of the structure:

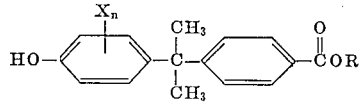

wherein R is H or a $C_1$ to $C_6$ alkyl group, wherein X is an alkyl radical of up to four carbons, chlorine or bromine, and wherein $n$ is 0 to 4, with an excess of ethylene chlorohydrin or ethylene oxide in an aqueous menstruum having a pH ranging from about 9 to 12 at a temperature ranging from 50° C. to 95° C., and thereafter rendering said reaction menstruum acidic.

4. A process in accordance with claim 3 further comprising the steps of recovering said compound of the structure:

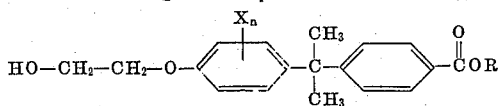

wherein R = H, from said reaction menstruum and recrystallizing said recovered product from nitromethane or nitroethane.

5. A polymer consisting essentially of recurring units of the

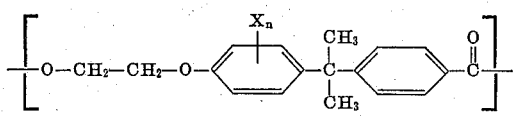

wherein X is an alkyl radical of up to four carbons, chlorine or bromine, and wherein $n$ is 0 to 4.

6. A copolymer consisting essentially of recurring units of the structure:

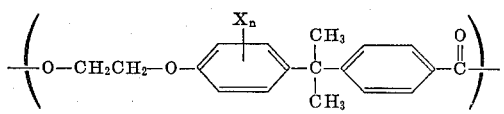

and recurring units of the structure:

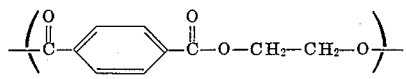

wherein X is an alkyl radical of up to 4 carbons, chlorine or bromine, and wherein $n$ is 0 to 4.

* * * * *